…

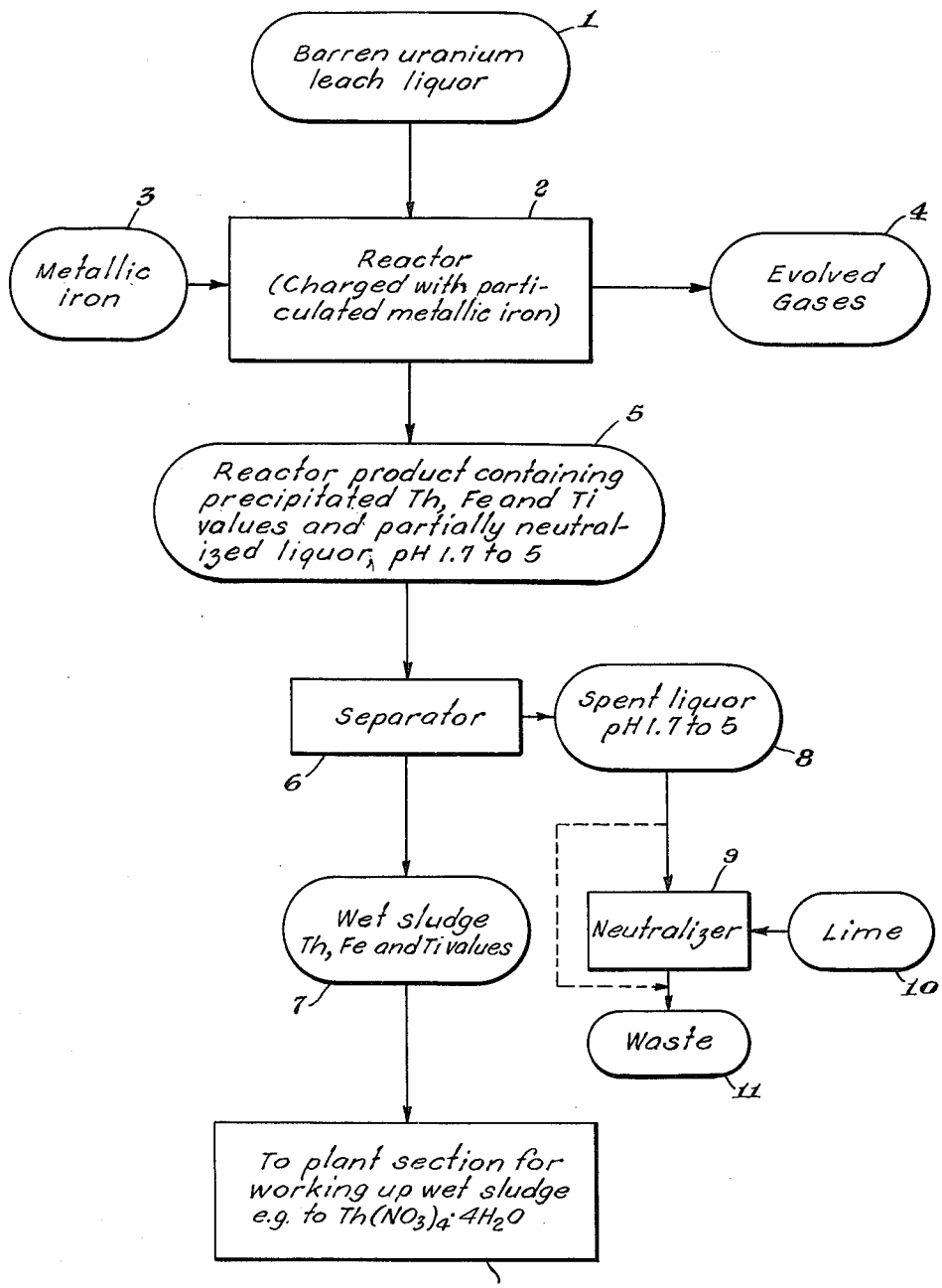

United States Patent Office 3,091,512
Patented May 28, 1963

3,091,512
THORIUM RECOVERY FROM BARREN URANIUM LEACH LIQUORS
Richard A. Mock and William N. Vanderkooi, Midland, Mich., assignors to The Dow Chemical Company, Midland, Mich., a corporation of Delaware
Filed Dec. 15, 1959, Ser. No. 859,817
4 Claims. (Cl. 23—14.5)

The invention relates to an improved method for recovering thorium values from an acidic barren uranium leach liquor containing thorium.

This application is a continuation-in-part of a copending application Serial No. 688,339, filed October 4, 1957, now abandoned.

Thorium currently is obtained by acid leaching monazite ore followed by separating the thorium from rare earth elements present in the acid leaching solution. This is an expensive source of thorium since it must be separated from a large amount of rare earth elements of similar chemical nature.

On the other hand, the hydrometallurgical extraction of uranium ores such as are obtained from the Blind River district of Ontario, Canada, yields a leach liquor containing uranium, about 50 to 65 percent as much thorium as uranium, in addition to iron, calcium, aluminum, phosphorus, sulfur, yttrium and small amounts of other rare earth elements. The leach liquor from which the uranium has been substantially removed (hereinafter referred to as barren leach liquor) is neutralized with lime and discarded, as by sewering, for lack of an economically feasible means for recovering the metal values it contains.

It is accordingly an object of the present invention to provide a low cost method for recovering thorium values from the barren leach liquor.

Other objects and advantages of the present invention will become apparent to those skilled in the art upon becoming familiar with the following description and the annexed drawing.

In said annexed drawing the single FIGURE is a diagrammatic representation of an apparatus and the steps employed in carrying out the present improved process.

The invention is based upon the discovery that by bringing a highly acidic barren leach liquor containing thorium, ferric iron and phosphate in soluble form into intimate contact with metallic iron, substantially in the absence of air, the said ferric iron is reduced to the ferrous form and simultaneously the pH of the barren leach liquor is increased whereby said phosphate is transformed from said soluble form so that a thorium phosphate-containing sludge is precipitated as lightly suspended matter and may be recovered from the so-processed barren leach liquor.

Barren leach liquor is highly acidic, having a pH of 1.8 or less. If such an acidic solution is neutralized to a higher pH, e.g., pH 3.5 to 4.0, with a strongly alkaline material such as calcium oxide or caustic soda, a thorium sludge is precipitated which contains iron as ferric hydroxide in greater than 1:1 proportion, by weight, to the thorium. Furthermore, because of the nature of the reaction between strongly alkaline material and a strong acid of the type used for leaching the ores, such as sulfuric acid, the pH change during neutralization is rapid making control difficult. Because of this, the pH of the barren leach liquor will often be raised into the alkaline region with resulting precipitation of ferric, aluminum and calcium hydroxides when neutralization is attempted with strongly alkaline material.

According to the present invention this difficulty is overcome by the use of iron metal to reduce ferric ions already in the leach liquor to ferrous ions which do not form a hydroxide precipitate at the pH necessary for precipitation of the thorium sludge so that the thorium can be more selectively precipitated. Also by the use of iron alone to exhaust most of the acid in the barren leach liquor and raise the solution pH, it is impossible to raise the pH into the alkaline region. Precipitation of undesirable hydroxides is thus avoided. Insofar as it is known, using iron to cause precipitation of the thorium gives a sludge containing a higher concentration of thorium than heretofore obtained from leach liquors by precipitation methods.

The chemistry of the precipitation step is believed to be as follows: Thorium values and phosphate values, in accordance with the solubility product constants of the thorium phosphates, may coexist in the aqueous barren leach liquor substantially in proportion to the extent that the phosphate values are tied up as the free acid or as a soluble ferric phosphate complex. Upon carrying out the reduction of ferric iron, in the barren leach liquor, to the ferrous form, the ferric phosphate complex is dissociated and destroyed freeing phosphate ions. But phosphate ions in highly acidic solutions, such as solutions having a pH value of about 1.5 or less, tend to form undissociated phosphoric acid. Significant concentrations of the ions $HPO_4^=$ and $PO_4^\equiv$ are not to be expected at very low solution pH values even in the absence of iron. Increasing the pH of the barren leach liquor to a value of at least 1.7 while destroying the ferric phosphate complex, according to the practice of the invention, thus assures the availability of $HPO_4^=$ ions which are believed to precipitate thorium values mainly as $$Th(HPO_4)_2 \cdot 2H_2O$$

Heretofore it was not known that ferric iron binds phosphate ions very tightly in the state in which iron and phosphorus are found in barren leach liquor. Therefore it was entirely unexpected that phosphate in soluble form can coexist with thorium ions in aqueous solution and that upon treating a barren leach liquor in accordance with the invention so as to both bring about the reduction of ferric iron and increase the pH of the barren leach liquor to a value of at least 1.7 that this soluble form of phosphate is transformed to phosphate ions which are capable of combining with thorium ions to cause precipitation of a thorium phosphate.

The following is a more detailed description of the procedure, reference being had to the said annexed drawing:

In carrying out the invention our preferred method is to pass the barren leach liquor 1 upwardly through a suitable vessel such as a tower 2, charged with scrap iron pieces 3. However, a tank or even a trough through which solutions can be passed, and from which air can be excluded, or in which an inert atmosphere can be maintained, could be used as the reactor vessel. The iron may be in the form of fragments, turnings, filings, etc. The precipitate which forms is very light. It readily remains suspended in the liquor, and is carried upward and out of the reactor, away from the metallic iron, by the flow of processed leach liquor. The flow of the leach liquor is made rapid enough to carry away the sludge but not rapid enough to carry away very dense iron or iron oxide particles. Evolved gases 4 formed by the action of the acidic solution on the metallic iron are allowed to escape, as through a float check valve, at the top of the reactor.

The barren leach liquor must be in contact with iron long enough for the neutralization and for reduction reactions to approach a desired degree of completion. Thus any combination of iron particle size, length of travel of solution through the iron bed, geometry of the bed, and time for solution to pass through the bed which will cause precipitation and removal of the thorium as a thorium phosphate is adequate. If the combination of the foregoing factors is such that the contact between the iron and the solution is insufficient, then not all of the thorium will be precipitated and it can be detected in the effluent stream. An indication of adequate contact is the pH of the solution leaving the bed. For isolation of 50–80 percent of the thorium values contained in the barren leach liquor, sufficient reactor inventory time and exposed surface of iron are preferred to obtain a pH range for liquor leaving the bed of pH 2.0 to 4.0, although thorium will precipitate at a pH as low as 1.7 and as high as the pH attained through neutralization of all the acid by the iron, generally about pH 5. The optimum percentage of recovery depends upon the economics of the process. Under prolonged reactor inventory time thorium may be removed quantitatively from barren leach liquor by metallic iron according to the invention.

The reactor product 5 containing the finely divided precipitate particles in suspension is transferred to a separator 6 such as a filter or settling tank where the suspended matter is removed as a final product in the form of a wet sludge 7 containing the desired thorium values.

For disposal purposes, the spent liquor effluent 8 from the separator may be further neutralized as at 9 as by treatment with lime 10, or otherwise disposed of as waste 11.

For purposes of selecting a sample for control and analysis or to prepare a dried finished product, wet sludge from 7 may be washed with water and oven dried thereby obtaining a dried powder of more or less amorphous nature. The dried powder normally contains as major constituents 15 to 35 percent thorium, 6 to 20 percent iron, 1 to 6 percent titanium and 3 to 10 percent phosphorus, in addition to minor constituents such as Al, Si, S and Mg.

If desired, the said wet sludge 7 may be transferred to the plant section 12 for purification and conversion of thorium values to metallic thorium, specific soluble or other compounds of thorium, e.g., $Th(NO_3)_4 \cdot 4H_2O$, by known methods. A preferred method is to remove excess water from the sludge, as by centrifuging, and dissolve the sludge in 93 percent sulfuric acid. After filtering the solution, the thorium is preferably reprecipitated with 5 percent sodium pyrophosphate. The precipitate so obtained is separated and redissolved in 93 percent sulfuric acid. Thorium is again precipitated by the addition of 50 percent sodium hydroxide, after which the precipitate is separated and dissolved in 65 percent nitric acid. The nitric acid solution containing thorium is then concentrated to produce crystals of thorium nitrate which are separated and dried to obtain a thorium nitrate product. Metallic thorium can be obtained by reduction.

The following examples are illustrative of the practice of the invention, the pertinent data of which are assembled in the accompanying table.

Example I 19.2 liters of barren leach liquor was pumped from a reservoir through flexible tubing with a finger pump and the flow rate measured with a rotameter. The solution was passed up through a column or reactor tower 2 inches in diameter which was charged to a depth of about 17 inches with a composite comprising about a half-pound of lathe turnings of cold rolled steel and one pound of degreased iron filings. Gases liberated in the column were allowed to escape through a float check valve at the top of the column. The column effluent, containing thorium sludge in suspension, entered two settling tanks where about half of the sludge settled out. The spent liquor drawn from the settling tanks was passed through a cylindrical coarse frit filter to remove all remaining solids. The pH of the effluent from the filter was measured and recorded. At the completion of the run the solid material collected from the settling tanks was combined and filtered, dried at 70 to 80° C., weighed, and then analyzed by X-ray fluorescence methods. The feed solution and spent liquor were also analyzed by X-ray fluorescence methods.

Example II 19.4 liters of barren leach liquor was processed in the same manner as that described in Example I except that the flow rate was decreased and the amount of degreased iron filings in the reactor tower was increased to two pounds.

| Example Number | 1 | 2 |
| --- | --- | --- |
| Wt. of iron in tower (lbs.) | 1.5 | 2.5 |
| Depth of charge (in.) | 17 | 17 |
| Vol. of barren leach liquor processed (liters) | 19.2 | 19.4 |
| Flow rate (cc./min.) | 28 | 22 |
| Linear Velocity a (cm./min.) | 1.4 | 1.1 |
| Barren leach liquor composition: | | |
| Th (g./l.) | 0.28 | 0.28 |
| Fe (g./l.) | 0.74 | 0.74 |
| Spent liquor composition: | | |
| Th (g./l.) | 0.10 | 0.08 |
| Fe (g./l.) | 1.6 | 1.5 |
| Th precipitated (g./l.) | 0.18 | 0.20 |
| Th recovery (percent) | 64 | 71 |
| Composition of dried sludge: | | |
| Th, percent | 29.6 | 31.1 |
| Fe, percent | 8 | 6.5 |
| Ti, percent | 2.8 | 1.1 |
| Wt. of sludge collected (g.) | 6.2 | 7.6 |
| Lbs. iron dissolved per lb. thorium ppt'd | 4.9 | 4.0 |
| pH of spent liquor | 2.5 | 3.5 | a Calculated on basis actual flow and on the cross section of unpacked tower.

Among the advantages of the invention is the functional simplicity derived from combined reduction and precipitation of thorium with a single reagent. The absence of ferrous, aluminum and calcium hydroxide contamination of the sludge, the lowered concentration of ferric iron in the sludge, and the high concentration of thorium values in the sludge are factors reducing the difficulty of subsequent purification and conversion of the sludge to metallic thorium or specific compounds of thorium.

Although a specific embodiment is described in the above specification the process is not to be considered as limited thereto as it is obvious many modifications could be made using the principles herein disclosed and claimed

What is claimed is:

1. In a process for recovering thorium values from acidic barren uranium leach liquor containing thorium, ferric iron and phosphate in aqueous solution, said phosphate being held in a form soluble in the presence of thorium, the improvement which comprises bringing the said barren leach liquor into intimate contact with a bed of metallic iron substantially in the absence of air and for a time sufficient whereby phosphate is transformed from said soluble form so that a sludge containing thorium phosphate is precipitated, and separating the thorium phosphate containing sludge from the so-processed barren leach liquor.

2. The process as in claim 1 in which the soluble form of phosphate is selected from the group consisting of a ferric phosphate complex, and a mixture thereof with at least one free phosphoric acid.

3. In a process for recovering thorium values from acidic barren uranium leach liquor containing thorium, ferric iron and phosphate in aqueous solution, said phosphate being held in a form soluble in the presence of thorium, the improvement which comprises flowing the said barren leach liquor upwardly through a bed of particulated iron substantially in the absence of air and for a time sufficient whereby phosphate is transformed from said soluble form so that a thorium phosphate-containing sludge is precipitated; maintaining a sufficiently rapid flow of the barren leach liquor through the bed of iron to carry the thorium phosphate-containing sludge so precipitated away from said bed of iron; and recovering the said thorium phosphate-containing sludge from the so-processed barren leach liquor.

4. In a process for recovering thorium values from acidic uranium leach liquor having a pH in the range of 1.7 to 5 and containing thorium, ferric iron and phosphate in aqueous solution, said phosphate being held in a form soluble in the presence of thorium, the steps which comprise: bringing the said barren leach liquor into intimate contact with a bed of metallic iron substantially in the absence of air, whereby a precipitate containing thorium phosphate as a major constituent is formed; and separating the thorium phosphate containing precipitate from the so-processed barren leach liquor.

References Cited in the file of this patent

UNITED STATES PATENTS

| | | |
|---|---|---|
| 2,815,261 | Thunaes et al. | Dec. 3, 1957 |
| 2,815,262 | Bridger et al. | Dec. 3, 1957 |